United States Patent [19]

Lee

[11] Patent Number: 5,485,216
[45] Date of Patent: Jan. 16, 1996

[54] VIDEO FORMAT CONVERSION APPARATUS FOR HIGH DEFINITION TELEVISION

[75] Inventor: Dong H. Lee, Seoul, Rep. of Korea

[73] Assignee: Goldstar Co., Ltd., Seoul, Rep. of Korea

[21] Appl. No.: 288,777

[22] Filed: Aug. 11, 1994

[30] Foreign Application Priority Data

Aug. 18, 1993 [KR] Rep. of Korea ............... 16036/1993

[51] Int. Cl.⁶ .................. H04N 7/01; H04N 5/46
[52] U.S. Cl. ............. 348/443; 348/441; 348/555
[58] Field of Search .................. 348/443, 441, 348/445, 446, 448, 449, 452, 458, 459, 555, 556, 558, 415, 416, 417, 400–402, 407; H04N 5/46, 7/01, 5/44

[56] References Cited

U.S. PATENT DOCUMENTS

| | | | |
|---|---|---|---|
| 4,751,573 | 6/1988 | Kubota | 348/458 |
| 5,029,002 | 7/1991 | Citta et al. | 358/141 |
| 5,128,750 | 7/1992 | Katagiri et al. | 348/458 |
| 5,132,793 | 7/1992 | Hirahata et al. | 348/556 |
| 5,134,477 | 7/1992 | Knauer et al. | 358/136 |
| 5,138,659 | 8/1992 | Kelkar et al. | 348/443 |
| 5,146,331 | 9/1992 | Tsuchida | 348/558 |
| 5,218,436 | 6/1993 | Sugiyama et al. | 348/445 |
| 5,329,309 | 7/1994 | Dorricott et al. | 348/446 |
| 5,343,238 | 8/1994 | Takata et al. | 348/556 |
| 5,347,318 | 9/1994 | Kobayashi et al. | 348/558 |

FOREIGN PATENT DOCUMENTS

| | | | |
|---|---|---|---|
| 3145884 | 6/1991 | Japan | H04N 5/46 |
| 6189220 | 7/1994 | Japan | H04N 5/46 |

Primary Examiner—Safet Metjahic
Attorney, Agent, or Firm—Finnegan, Henderson, Farabow, Garrett & Dunner

[57] ABSTRACT

A video format conversion apparatus for a high definition television comprising a decoding circuit for decoding a transmitted, encoded signal into a video signal, a frame rate conversion circuit for converting a frame rate of the video signal from the decoding circuit into 30 Hz, a decimation circuit for converting the number of vertical and horizontal scanning lines of a selected one of the video signal from the decoding circuit and an output video signal from the frame rate conversion circuit, an interlaced scanning format conversion/selection circuit for converting a scanning format of a selected one of the video signals from the decoding circuit and the frame rate conversion circuit and an output video signal from the decimation circuit into an interlaced scanning format and outputting a selected one of the converted video signal of the interlaced scanning format and the video signal from the decoding circuit, and a selection control controller for controlling the frame rate conversion circuit, the decimation circuit and the interlaced scanning format conversion/selection circuit in response to video format information from the decoding circuit.

20 Claims, 12 Drawing Sheets

FIG.2

| INPUT VIDEO FORMAT | SWITCH(31) | SWITCH(41) | SWITCH(43) |
|---|---|---|---|
| 1050lines Interlaced scanning,30Hz | X | X | (1)output selection |
| 1050lines progressive scanning,30Hz | X | (1)output selection | (42)output selection |
| 1050lines progressive scanning,24Hz | X | (2)output selection | (42)output selection |
| 787.5lines progressive scanning,60Hz | (2)output selection | (33)output selection | (42)output selection |
| 787.5lines progressive scanning,30Hz | (1)output selection | (33)output selection | (42)output selection |
| 787.5lines progressive scanning,24Hz | (2)output selection | (33)output selection | (42)output selection |

5,485,216

VIDEO FORMAT CONVERSION APPARATUS FOR HIGH DEFINITION TELEVISION

BACKGROUND OF THE INVENTION

The present invention relates in general to the conversion of a video format of a high definition television (referred to hereinafter as HDTV) signal, and more particularly to a video format conversion apparatus for an HDTV in which the video format of the HDTV signal is converted into a display format of an interlaced scanning type with 1050 vertical scanning lines.

Basically, the HDTV signal can be encoded and decoded into various video formats with no limitation to a single video format. Namely, the HDTV signal can be encoded and decoded into six video formats, an interlaced scanning format with 1050 vertical scanning lines and a field rate of 60 Hz, progressive scanning formats with 1050 vertical scanning lines and frame rates of 24 Hz and 30 Hz, and progressive scanning formats with 787.5 vertical scanning lines and frame rates of 24 Hz, 30 Hz and 60 Hz.

In encoding and decoding the HDTV signal, the video formats with the frame rates 24 Hz and 30 Hz are used for a film mode, since they make transmission of a movie film more efficient.

Although there are various transmitted video formats as mentioned above, a display format is limited to a single type depending on a characteristic of a monitor. This requires a video format conversion apparatus capable of converting any video format of the HDTV signal into the display format depending on the characteristic of the monitor.

SUMMARY OF THE INVENTION

Therefore, the present invention has been made in view of the above problem, and it is an object of the present invention to provide a video format conversion apparatus for an HDTV in which any video format of an HDTV signal is converted into a display format of an interlaced scanning type with 1050 vertical scanning lines.

In accordance with the present invention, the above and other objects can be accomplished by a provision of a video format conversion apparatus for a high definition television comprising decoding means for decoding a transmitted, encoded signal into a video signal; frame rate conversion means for converting a frame rate of the video signal from said decoding means into 30 Hz; decimation means for converting the number of vertical and horizontal scanning lines of a selected one of the video signal from said decoding means and an output video signal from said frame rate conversion means; interlaced scanning format conversion/selection means for converting a scanning format of a selected one of the video signals from said decoding means and said frame rate conversion means and an output video signal from said decimation means into an interlaced scanning format and outputting a selected one of the converted video signal of the interlaced scanning format and the video signal from said decoding means; and selection control means for controlling said frame rate conversion means, said decimation means and said interlaced scanning format conversion/selection means in response to video format information from said decoding means.

BRIEF DESCRIPTION OF THE DRAWINGS

The above and other objects, features and advantages of the present invention will be more clearly understood from the following detailed description taken in conjunction with the accompanying drawings, in which:

FIG. 2 is a table illustrating an operation of a selection controller in FIG. 1;

DETAILED DESCRIPTION OF THE PREFERRED EMBODIMENTS

Figure 1:
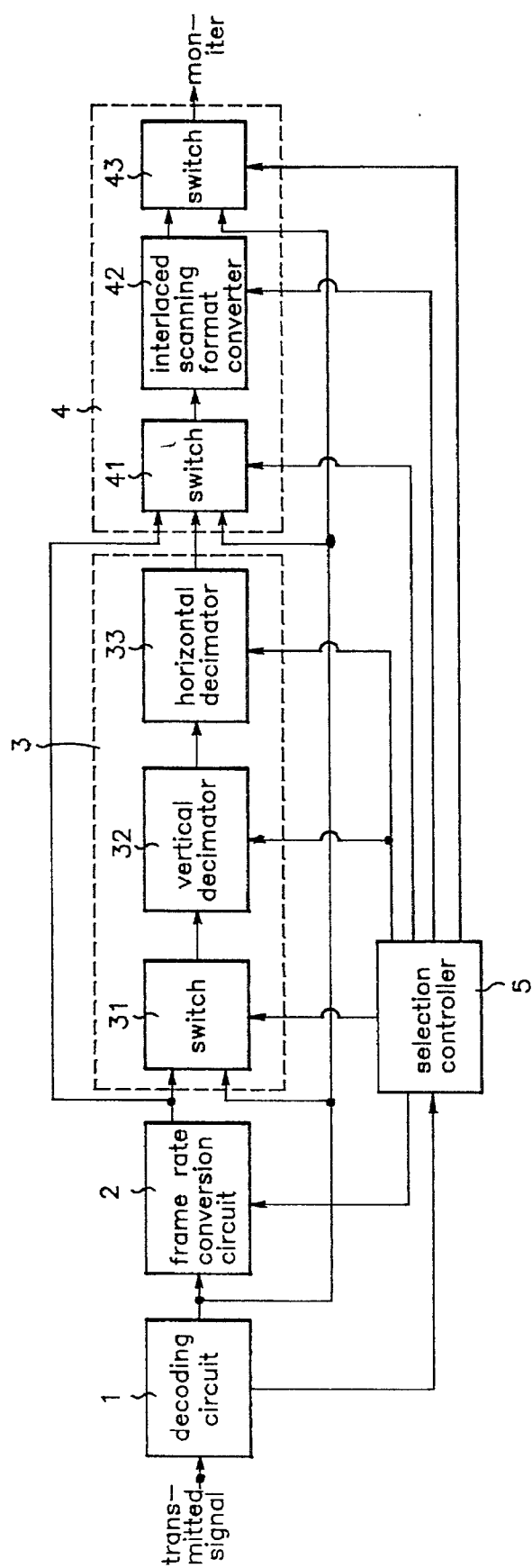
FIG. 1 is a block diagram of a video format conversion apparatus for an HDTV in accordance with the present invention.

Referring to FIG. 1, there is shown a block diagram of a video format conversion apparatus for an HDTV in accordance with a preferred embodiment of the present invention. As shown in this drawing, the video format conversion apparatus comprises a decoding circuit 1, a frame rate conversion circuit 2, a decimation circuit 3, an interlaced scanning format conversion/selection circuit 4 and a selection controller 5.

The decoding circuit 1 is adapted to decode a compressed or encoded bit stream transmitted from an encoder into a significant video signal.

The frame rate conversion circuit 2 is adapted to convert a frame rate of the video signal from the decoding circuit 1 into 30 Hz under control of the selection controller 5.

The decimation circuit 3 is adapted to convert the number of vertical and horizontal scanning lines of a selected one of the video signal from the decoding circuit 1 and an output video signal from the frame rate conversion circuit 2 under the control of the selection controller 5. To this end, the decimation circuit 3 includes a switch 31, a vertical decimator 32 and a horizontal decimator 33.

The switch 31 acts to select one of the video signals from the decoding circuit 1 and the frame rate conversion circuit 2 under the control of the selection controller 5 and output the selected video signal to the vertical decimator 32.

The vertical decimator 32 functions to convert the number of the vertical scanning lines per frame of an output video signal from the switch 31 into 1050 under the control of the selection controller 5.

The horizontal decimator 33 functions to convert the number of pixels per line of an output video signal from the vertical decimator 32 into that of a 1050-line video format under the control of the selection controller 5.

The interlaced scanning format conversion/selection circuit 4 is adapted to convert a scanning format of a selected one of the video signals from the decoding circuit 1 and the frame rate conversion circuit 2 and an output video signal from the horizontal decimator 33 of the decimation circuit 3 into an interlaced scanning format under the control of the selection controller 5 and output a selected one of the converted video signal of the interlaced scanning format and the output video signal from the decoding circuit 1 under the control of the selection controller 5. To this end, the interlaced scanning format conversion/selection circuit 4 includes a switch 41, an interlaced scanning format converter 42 and a switch 43.

The switch 41 acts to select one of the video signals from the decoding circuit 1, the frame rate conversion circuit 2 and the horizontal decimator 33 under the control of the selection controller 5 and output the selected video signal to the interlaced scanning format converter 42.

The interlaced scanning format converter 42 functions to convert the scanning format of an output video signal from the switch 41 into the interlaced scanning format under the control of the selection controller 5.

The switch 43 acts to select one of the video signal from the decoding circuit 1 and an output video signal from the interlaced scanning format converter 42 under the control of the selection controller 5.

The selection controller 5 is adapted to control the frame rate conversion circuit 2, the switch 31 and the vertical and horizontal decimators 32 and 33 in the decimation circuit 3, and the interlaced scanning format converter 42 and the switches 41 and 43 in the interlaced scanning format conversion/selection circuit 4 according to a scanning format of the video signal transmitted from the encoder in response to video format information from the decoding circuit 1.

The selection controller 5 controls the frame rate conversion circuit 2, the decimation circuit 3 and the interlaced scanning format conversion/selection circuit 4 using program name and format information appended to the video signal transmitted from the encoder in such a manner that any scanning format of the transmitted video signal can be converted into a display format of an interlaced scanning type with 1050 vertical scanning lines.

FIG. 2 is a table illustrating the operation of the selection controller 5. As shown in this drawing, the selection controller 5 controls the frame rate conversion circuit 2, the decimation circuit 3 and the interlaced scanning format conversion/selection circuit 4 in response to the video format information from the decoding circuit 1, respectively with respect to the cases where the scanning format of the transmitted video signal is of an interlaced scanning type with 1050 vertical scanning lines and a frame rate of 30 Hz, of a progressive scanning type with the 1050 vertical scanning lines and the frame rate of 30 Hz, of a progressive scanning type with the 1050 vertical scanning lines and a frame rate of 24 Hz, of a progressive scanning type with 787.5 vertical scanning lines and the frame rate of 60 Hz, of a progressive scanning type with the 787.5 vertical scanning lines and the frame rate of 30 Hz and of a progressive scanning type with the 787.5 vertical scanning lines and the frame rate of 24 Hz.

In detail, in the case where the scanning format of the transmitted video signal is of the interlaced scanning type with the 1050 vertical scanning lines and the frame rate of 30 Hz, the selection controller 5 controls the switch 43 to select the video signal from the decoding circuit 1.

In the case where the scanning format of the transmitted video signal is of the progressive scanning type with the 1050 vertical scanning lines and the frame rate of 30 Hz, the selection controller 5 controls the switch 41 to select the video signal from the decoding circuit 1, the interlaced scanning format converter 42 to process the video signal from the switch 41 and the switch 43 to select the video signal from the interlaced scanning format converter 42, respectively.

In the case where the scanning format of the transmitted video signal is of the progressive scanning type with the 1050 vertical scanning lines and the frame rate of 24 Hz, the selection controller 5 controls the frame rate conversion circuit 2 to process the video signal from the decoding circuit 1, the switch 41 to select the video signal from the frame rate conversion circuit 2, the interlaced scanning format converter 42 to process the video signal from the switch 41 and the switch 43 to select the video signal from the interlaced scanning format converter 42, respectively.

In the case where the scanning format of the transmitted video signal is of the progressive scanning type with the 787.5 vertical scanning lines and the frame rate of 60 Hz, the selection controller 5 controls the frame rate conversion circuit 2 to process the video signal from the decoding circuit 1, the switch 31 to select the video signal from the frame rate conversion circuit 2, the vertical and horizontal decimators 32 and 33 to process the video signal from the switch 31, the switch 41 to select the video signal from the horizontal decimator 33, the interlaced scanning format converter 42 to process the video signal from the switch 41 and the switch 43 to select the video signal from the interlaced scanning format converter 42, respectively.

In the case where the scanning format of the transmitted video signal is of the progressive scanning type with the 787.5 vertical scanning lines and the frame rate of 30 Hz, the selection controller 5 controls the switch 31 to select the video signal from the decoding circuit 1, the vertical and horizontal decimators 32 and 33 to process the video signal from the switch 31, the switch 41 to select the video signal from the horizontal decimator 33, the interlaced scanning format converter 42 to process the video signal from the switch 41 and the switch 43 to select the video signal from the interlaced scanning format converter 42, respectively.

In the case where the scanning format of the transmitted video signal is of the progressive scanning type with the 787.5 vertical scanning lines and the frame rate of 24 Hz, the selection controller 5 controls the frame rate conversion circuit 2 to process the video signal from the decoding circuit 1, the switch 31 to select the video signal from the frame rate conversion circuit 2, the vertical and horizontal decimators 32 and 33 to process the video signal from the switch 31, the switch 41 to select the video signal from the horizontal decimator 33, the interlaced scanning format converter 42 to process the video signal from the switch 41 and the switch 43 to select the video signal from the interlaced scanning format converter 42, respectively.

The operation of the video format conversion apparatus with the above-mentioned construction in accordance with the present invention will hereinafter be described in detail with reference to FIG. 1.

The compressed or encoded bit stream transmitted from the encoder is decoded into the video signal and video information by the decoding circuit 1. The format conversion of the video signal from the decoding circuit 1 is performed according to the video format information therefrom as follows:

First, in the case where the video format information from the decoding circuit 1 indicates that the scanning format of the video signal transmitted thereto is of the interlaced scanning type with the 1050 vertical scanning lines and the frame rate of 30 Hz, the video signal from the decoding circuit 1 is directly selected by the switch 43 and then outputted to a monitor under the control of the selection controller 5, since the scanning format of the transmitted video signal is the same as the display format.

Second, in the case where the video format information from the decoding circuit 1 indicates that the scanning format of the video signal transmitted thereto is of the progressive scanning type with the 1050 vertical scanning lines and the frame rate of 30 Hz, the video signal from the decoding circuit 1 is selected by the switch 41 and the scanning format thereof is converted into the interlaced scanning format by the interlaced scanning format converter 42 under the control of the selection controller 5 because the display format is of the interlaced scanning type. Then, the video signal from the interlaced scanning format converter 42 is selected by the switch 43 and outputted to the monitor under the control of the selection controller 5.

Third, in the case where the video format information from the decoding circuit 1 indicates that the scanning format of the video signal transmitted thereto is of the progressive scanning type with the 1050 vertical scanning lines and the frame rate of 24 Hz, the frame rate of the video signal from the decoding circuit 1 is converted into 30 Hz by the frame rate conversion circuit 2 under control of the selection controller 5 because the display format is of the interlaced scanning type with the frame rate of 30 Hz. Then, the video signal from the frame rate conversion circuit 2 is selected by the switch 41 and the scanning format thereof is converted into the interlaced scanning format by the interlaced scanning format converter 42 under the control of the selection controller 5. As a result, the video signal from the interlaced scanning format converter 42 is selected by the switch 43 and outputted to the monitor under the control of the selection controller 5.

Fourth, in the case where the video format information from the decoding circuit 1 indicates that the scanning format of the video signal transmitted thereto is of the progressive scanning type with the 787.5 vertical scanning lines and the frame rate of 60 Hz, the frame rate of the video signal from the decoding circuit 1 is converted into 30 Hz by the frame rate conversion circuit 2 under control of the selection controller 5 because the display format is of the interlaced scanning type with the 1050 vertical scanning lines and the frame rate of 30 Hz. Then, the video signal from the frame rate conversion circuit 2 is selected by the switch 31 and converted into that with the 1050 vertical scanning lines by the vertical and horizontal decimators 32 and 33 under the control of the selection controller 5. The video signal from the horizontal decimator 33 is selected by the switch 41 and the scanning format thereof is converted into the interlaced scanning format by the interlaced scanning format converter 42 under the control of the selection controller 5. As a result, the video signal from the interlaced scanning format converter 42 is selected by the switch 43 and outputted to the monitor under the control of the selection controller 5.

Fifth, in the case where the video format information from the decoding circuit 1 indicates that the scanning format of the video signal transmitted thereto is of the progressive scanning type with the 787.5 vertical scanning lines and the frame rate of 30 Hz, the video signal from the decoding circuit 1 is selected by the switch 31 and converted into that with the 1050 vertical scanning lines by the vertical and horizontal decimators 32 and 33 under the control of the selection controller 5 because the display format is of the interlaced scanning type with the 1050 vertical scanning lines. Then, the video signal from the horizontal decimator 33 is selected by the switch 41 and the scanning format thereof is converted into the interlaced scanning format by the interlaced scanning format converter 42 under the control of the selection controller 5. As a result, the video signal from the interlaced scanning format converter 42 is selected by the switch 43 and outputted to the monitor under the control of the selection controller 5.

Sixth, in the case where the video format information from the decoding circuit 1 indicates that the scanning format of the video signal transmitted thereto is of the progressive scanning type with the 787.5 vertical scanning lines and the frame rate of 24 Hz, the frame rate of the video signal from the decoding circuit 1 is converted into 30 Hz by the frame rate conversion circuit 2 under control of the selection controller 5 because the display format is of the interlaced scanning type with the 1050 vertical scanning lines and the frame rate of 30 Hz. Then, the video signal from the frame rate conversion circuit 2 is selected by the switch 31 and converted into that with the 1050 vertical scanning lines by the vertical and horizontal decimators 32 and 33 under the control of the selection controller 5. The video signal from the horizontal decimator 33 is selected by the switch 41 and the scanning format thereof is converted into the interlaced scanning format by the interlaced scanning format converter 42 under the control of the selection controller 5. As a result, the video signal from the interlaced scanning format converter 42 is selected by the switch 43 and outputted to the monitor under the control of the selection controller 5.

Figure 3:
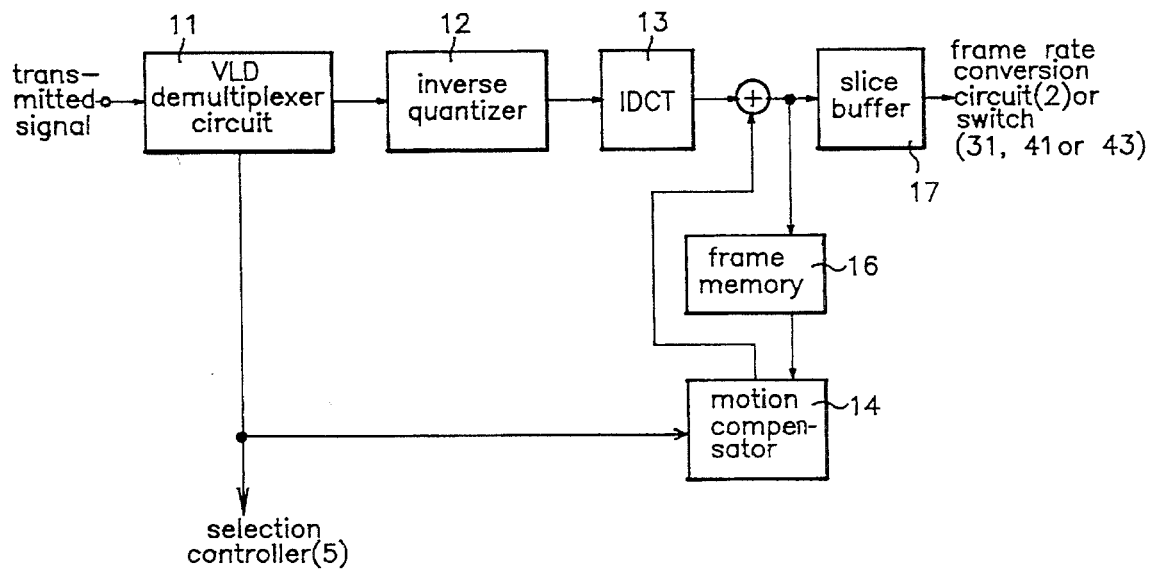
FIG. 3 is a detailed block diagram of a decoding circuit in FIG. 1.

Referring to FIG. 3, there is shown a detailed block diagram of the decoding circuit 1. As shown in this figure, the decoding circuit 1 includes a variable length decoder (VLD)/demultiplexer circuit 11, an inverse quantizer 12, an inverse discrete cosine transform (IDCT) unit 13, a motion compensator 14, an adder 15, a frame memory 16 and a slice buffer 17.

The VLD/demultiplexer circuit 11 is adapted to variable length-decode and demultiplex the encoded signal transmitted from the encoder to separate the video format information, quantized coefficients, a motion vector and a control parameter from the encoded signal.

The inverse quantizer 12 is adapted to inverse-quantize the quantized coefficients from the VLD/demultiplexer circuit 11 in response to the control parameter therefrom. The IDCT unit 13 acts to perform an inverse discrete cosine transform with respect to the inverse-quantized coefficients from the inverse quantizer 12 to obtain a displaced frame difference (DFD) signal based on video motion estimation.

The motion compensator 14 is adapted to compensate for a motion of a video signal stored in the frame memory 16 using the motion vector from the VLD/demultiplexer circuit 11. The adder 15 acts to add the DFD signal from the IDCT unit 13 and the motion-compensated video signal from the motion compensator 14 and output the resultant video signal to the frame memory 16 and the slice buffer 17 in the unit of macro block.

The frame memory 16 is adapted to store the video signal from the adder 15 in the unit of frame and output the stored video signal to the motion compensator 14. The slice buffer 17 functions to store the video signal from the adder 15 in the unit of slice and output the stored video signal in the unit of line.

In operation, the encoded signal transmitted from the encoder is variable length-decoded and demultiplexed in the unit of macro block by the VLD/demultiplexer circuit 11. As a result of the variable length-decoding and demultiplexing, the video format information, the quantized coefficients, the motion vector and the control parameter are extracted from the encoded signal. The video format information from the VLD/demultiplexer circuit 11 is applied to the selection controller 5 and the motion vector therefrom is applied to the motion compensator 14. Also, the quantized coefficients and the control parameter from the VLD/demultiplexer circuit 11 are applied to the inverse quantizer 12.

The inverse quantizer 12 inverse-quantizes the quantized coefficients from the VLD/demultiplexer circuit 11 in response to the control parameter therefrom. The inverse discrete cosine transform is performed with respect to the inverse-quantized coefficients from the inverse quantizer 12 by the IDCT unit 13.

Using the motion vector from the VLD/demultiplexer circuit 11, the motion compensator 14 compensates for the motion of the video signal stored in the frame memory 16 and outputs the motion-compensated video signal to the adder 15, which also receives the DFD signal from the IDCT unit 13. The adder 15 adds the DFD signal from the IDCT unit 13 and the motion-compensated video signal from the motion compensator 14 and outputs the resultant video signal to the frame memory 16 and the slice buffer 17 in the unit of macro block.

The video signal from the adder 15 is stored in the unit of frame in the frame memory 16. The video signal from the adder 15 is also stored in the unit of slice in the slice buffer 17, which outputs the stored video signal in the unit of line.

Figure 4:
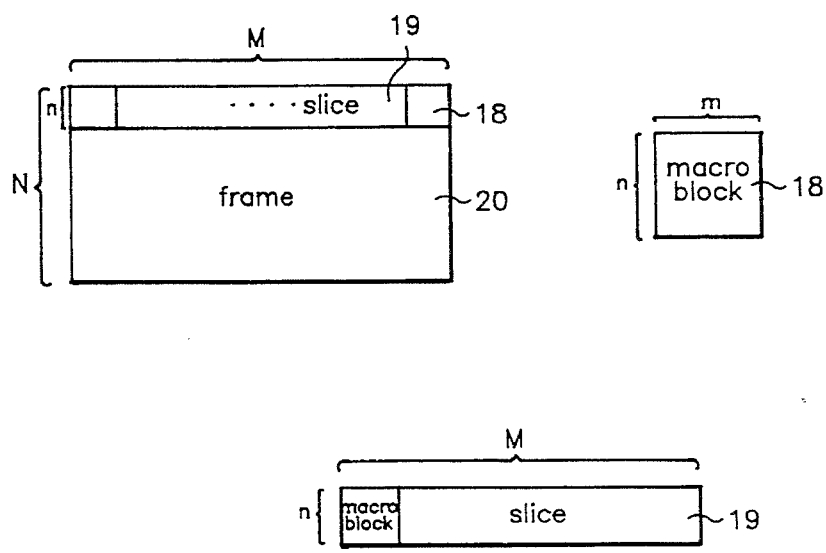
FIG. 4 is a view illustrating unit constructions of a macro block, a slice and a frame.

Basic units for the decoding process are classified into a macro block 18, a slice 19 and a frame 20 as shown in FIG. 4. The macro block 18 is a transmission unit of the video signal and consists of m×n pixels. Also, the macro block 18 is a processing unit for the VLD/demultiplexer circuit 11, the inverse quantizer 12, the IDCT unit 13, the motion compensator 14 and the adder 15. The slice 19 consists of M (the number of horizontal scanning lines)×n pixels. Namely, the slice 19 consists of M/m macro blocks and n lines. The frame 20 consists of N (the number of vertical scanning lines)/n slices.

Figure 5:
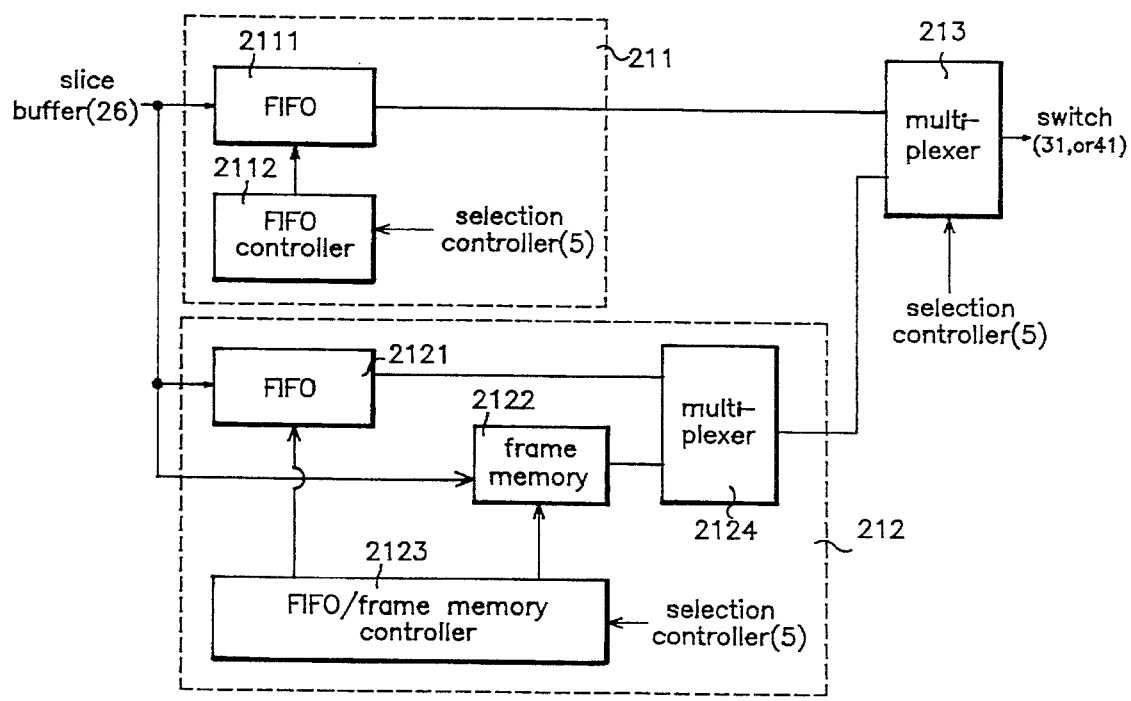
FIG. 5 is a detailed block diagram of a frame rate conversion circuit in FIG. 1.

Referring to FIG. 5, there is shown a detailed block diagram of the frame rate conversion circuit 2. As shown in this drawing, the frame rate conversion circuit 2 includes a 60 Hz frame rate converter 211, a 24 Hz frame rate converter 212 and a multiplexer 213.

The 60 Hz frame rate converter 211 is adapted to convert the frame rate of the video signal from the decoding circuit 1 into 30 Hz under the control of the selection controller 5 if it is 60 Hz. To this end, the 60 Hz frame rate converter 211 is provided with a first-in-first-out (FIFO) memory 2111 and an FIFO memory controller 2112.

Under the control of the FIFO memory controller 2112, the FIFO memory 2111 performs a write operation with respect to the video signal of the 60 Hz frame rate from the decoding circuit 1, skipping one of two frames at a period of two frame clocks, and a read operation with respect to the stored video signal at a period of twice that of the write operation to output a video signal of the 30 Hz frame rate to the multiplexer 213.

The FIFO memory controller 2112 controls the read and write operations of the FIFO memory 2111 under the control of the selection controller 5 to output the video signal of the 30 Hz frame rate.

The 24 Hz frame rate converter 212 is adapted to convert the frame rate of the video signal from the decoding circuit 1 into 30 Hz under the control of the selection controller 5 if it is 24 Hz. To this end, the 24 Hz frame rate converter 212 is provided with an FIFO memory 2121, a frame memory 2122, an FIFO/frame memory controller 2123 and a multiplexer 2124.

Under the control of the FIFO/frame memory controller 2123, the FIFO memory 2121 performs write and read operations with respect to a first one of four frames of the video signal of the 24 Hz frame rate from the decoding circuit 1 at a period of five frame clocks. The read frame from the FIFO memory 2121 is applied to the multiplexer 2124.

The frame memory 2122 performs write and read operations with respect to all the four frames of the video signal of the 24 Hz frame rate from the decoding circuit 1 in the unit of frame at the period of the five frame clocks under the control of the FIFO/frame memory controller 2123. The read frames from the frame memory 2122 is applied to the multiplexer 2124.

The FIFO/frame memory controller 2123 controls the read and write operations of the FIFO memory 2121 and the frame memory 2122 under the control of the selection controller 5.

The multiplexer 2124 selects alternately the frame from the FIFO memory 2121 and the frames from the frame memory 2122 to output a video signal of the 30 Hz frame rate to the multiplexer 213.

The multiplexer 213 is adapted to select one of the video signal from the FIFO memory 2111 of the 60 Hz frame rate converter 211 and the video signal from the multiplexer 2124 of the 24 Hz frame rate converter 212 under the control of the selection controller 5.

The operation of the frame rate conversion circuit 2 with the above-mentioned construction in accordance with the present invention will hereinafter be described in detail with reference to FIGS. 6A to 6H which are waveform diagrams of the signals from the components of the frame rate conversion circuit 2 in FIG. 5.

Figure 6A:
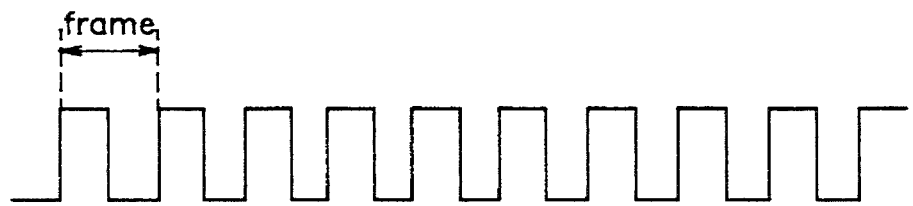
FIGS. 6A to 6G are waveform diagrams of signals from components of the frame rate conversion circuit in FIG. 5.
Figure 6B:

First, in the case where the frame rate of the video signal from the decoding circuit 1 as shown in FIG. 6B is 60 Hz, it must be converted into 30 Hz at a ratio of 2:1. To this end, the selection controller 5 operates the FIFO memory controller 2112 to enable the 60 Hz frame rate converter 211, while stops the operation of the FIFO/frame memory controller 2123 to disable the 24 Hz frame rate converter 212.

Figure 6C:
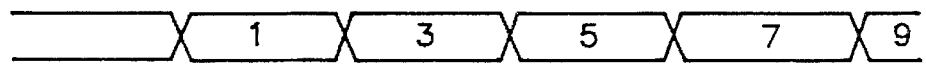
Figure 6D:
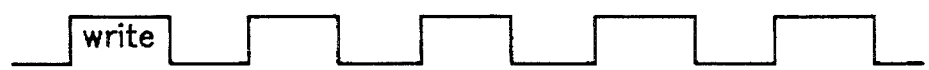

Upon being operated under the control of the selection controller 5, the FIFO memory controller 2112 outputs a write control signal as shown in FIG. 6D to control the write operation of the FIFO memory 2111. In response to the write control signal from the FIFO memory controller 2112, the FIFO memory 2111 performs the write operation with respect to the video signal of the 60 Hz frame rate from the decoding circuit 1 during a one frame clock interval at the period of two of the frame clocks as shown in FIG. 6A. Namely, the FIFO memory 2111 performs the write operation with respect to the video signal of the 60 Hz frame rate from the decoding circuit 1 as shown in FIG. 6B, skipping one of the two frames at the period of the two frame clocks, in response to the write control signal from the FIFO memory controller 2112. Then, the FIFO memory controller 2112 outputs a read control signal to control the read operation of the FIFO memory 2111. In response to the read control signal from the FIFO memory controller 2112, the FIFO memory 2111 performs the read operation with respect to the stored video signal at the period of twice that of the write operation. As a result, the FIFO memory 2111 outputs the video signal of the 30 Hz frame rate as shown in FIG. 6C.

The video signal from the FIFO memory 2111 as shown in FIG. 6C is selected by the multiplexer 213 and then applied to the switch 31 or 41 under the control of the selection controller 5.

On the other hand, in the case where the frame rate of the video signal from the decoding circuit 1 as shown in FIG. 6B, is 24 Hz, it must be converted into 30 Hz at a ratio of 4:5. To this end, the selection controller 5 operates the FIFO/frame memory controller 2123 to enable the 24 Hz frame rate converter 212, while stops the operation of the FIFO memory controller 2112 to disable the 60 Hz frame rate converter 211.

Figure 6E:
Figure 6F:
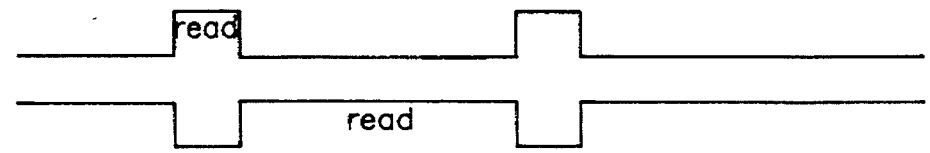

Upon being operated under the control of the selection controller 5, the FIFO/frame memory controller 2123 outputs a write control signal to control the write operation of the FIFO memory 2121. In response to the write control signal from the FIFO/frame memory controller 2123, the FIFO memory 2121 performs the write operation with respect to the first one of the four frames of the video signal of the 24 Hz frame rate from the decoding circuit 1 at the period of the five frame clocks. Namely, the FIFO memory 2121 performs the write operation with respect to the video signal of the 24 Hz frame rate from the decoding circuit 1 during a first frame clock interval at the period of five of the frame clocks as shown in FIG. 6E in response to the write control signal from the FIFO/frame memory controller 2123. Then, the FIFO/frame memory controller 2123 outputs a read control signal as shown in FIG. 6F to control the read operation of the FIFO memory 2121. In response to the read control signal from the FIFO/frame memory controller 2123, the FIFO memory 2121 performs the read operation with respect to the stored frame during the first frame clock interval at the period of five of the frame clocks as shown in FIG. 6E.

Figure 6G:
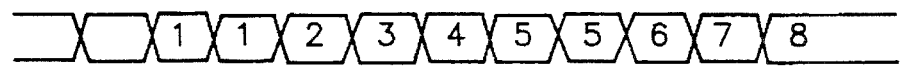

Also, the FIFO/frame memory controller 2123 outputs a write control signal to the frame memory 2122, thereby causing the frame memory 2122 to store all the four frames of the video signal of the 24 Hz frame rate from the decoding circuit 1 at the period of the five frame clocks. Then, the FIFO/frame memory controller 2123 outputs a read control signal as shown in FIG. 6G to the frame memory 2122, thereby causing the frame memory 2122 to perform the read operation with respect to all the stored four frames during a four-frame clock interval at the period of the five frame clocks as shown in FIG. 6F, after the first frame is read from the FIFO memory 2121.

The frame from the FIFO memory 2121 and the frames from the frame memory 2122 are sequentially selected by the multiplexer 2124, which thus outputs the video signal of the 30 Hz frame rate as shown in FIG. 6H.

In other words, at the period of the five frame clocks, the first one of the four frames of the video signal from the decoding circuit 1 is stored into the FIFO memory 2121 and at the same time all the four frames are stored into the frame memory 2122. The first frame is read from the FIFO memory 2121 and all the four frames are then read from the frame memory 2122. Then, the frame from the FIFO memory 2121 and the frames from the frame memory 2122 are sequentially selected by the multiplexer 2124. As a result, the video signal of the 30 Hz frame rate as shown in FIG. 6H is outputted from the multiplexer 2124.

The video signal from the multiplexer 2124 as shown in FIG. 6H is selected by the multiplexer 213 and then applied to the switch 31 or 41 under the control of the selection controller 5.

Figure 7:
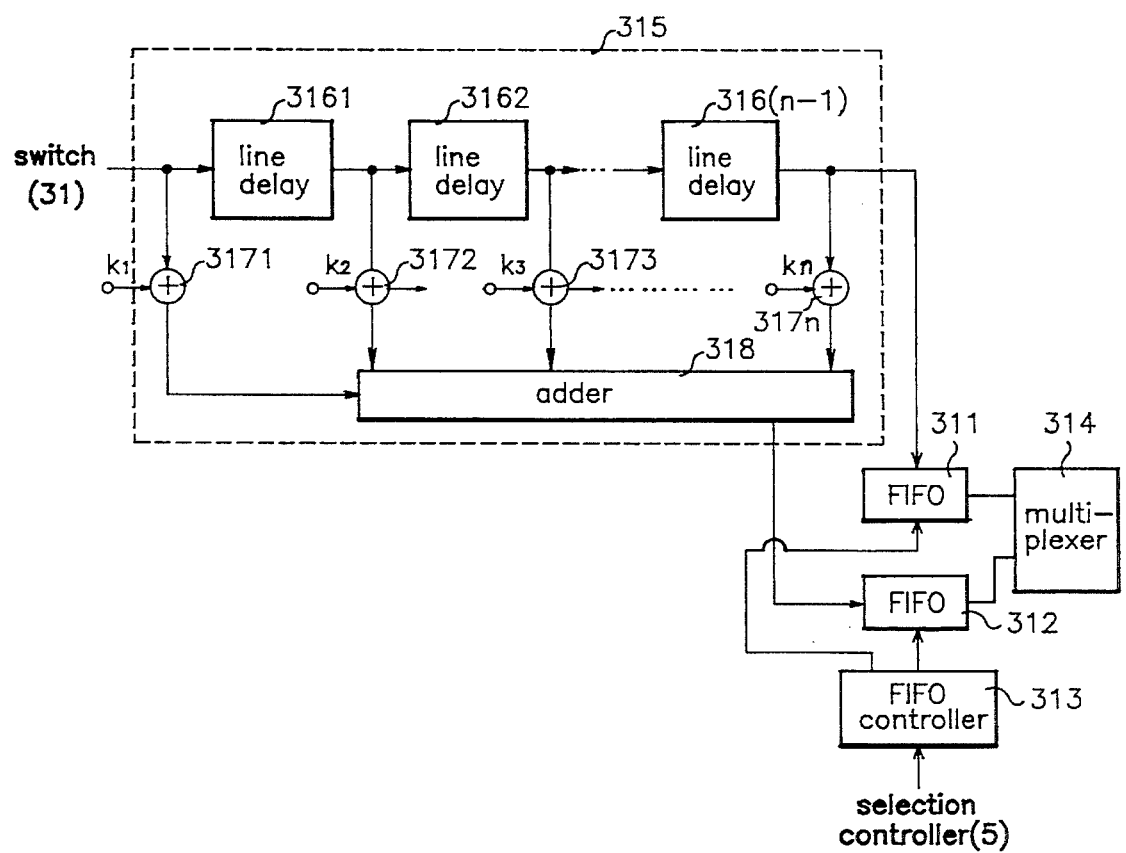
FIG. 7 is a detailed block diagram of an embodiment of a vertical decimator in FIG. 1.

Referring to FIG. 7, there is shown a detailed block diagram of an embodiment of the vertical decimator 32. As shown in this drawing, the vertical decimator 32 includes a filtering circuit 315, FIFO memories 311 and 312, an FIFO memory controller 313 and a multiplexer 314. With this construction, the vertical decimator 32 acts to convert the number of the vertical scanning lines per frame of the output video signal from the switch 31 into 1050 under the control of the selection controller 5 if it is 787.5. Alternatively, one of successive three lines of the input video signal may be repeated instead of employing the filtering circuit 315, for the purpose of making the construction simple.

The filtering circuit 315 includes a plurality of series-connected line delay elements 3161–316($n$–1) matched with the number of filter taps, a plurality of multipliers 3171–317$n$, each of which multiplies a corresponding one of the video signal from the switch 31 and output signals from the line delay elements 3161–316($n$–1) by a corresponding one of filtering coefficients K1-Kn, and an adder 318 for adding output signals from the multipliers 3171–317$n$ and outputting the resultant video signal to the FIFO memory 312. With this construction, the filtering circuit 315 removes a high frequency component from the video signal from the switch 31.

The FIFO memory 312 functions to perform write/read operations with respect to a first one of the successive three lines of the video signal from the adder 318 of the filtering circuit 315 under the control of the FIFO memory controller 313. The FIFO memory 311 acts to perform write/read operations with respect to the video signal from the last line delay element 316($n$–1) of the filtering circuit 315 in the unit of line under the control of the FIFO memory controller 313.

The FIFO memory controller 313 is adapted to control the write and read operations of the FIFO memories 312 and 311 under the control of the selection controller 5. The multiplexer 314 selects alternately output lines from the FIFO memories 311 and 312.

The operation of the embodiment of the vertical decimator 32 with the above-mentioned construction in accordance with the present invention will hereinafter be described in detail with reference to FIGS. 8A to 8G which are waveform diagrams of the signals from the components of the vertical decimator in FIG. 7.

In the case where the number of the vertical scanning lines per frame of the output video signal from the switch 31 is 787.5, it must be converted into 1050 at a ratio of 3:4. To this end, the selection controller 5 operates the FIFO memory controller 313.

Figure 8A:
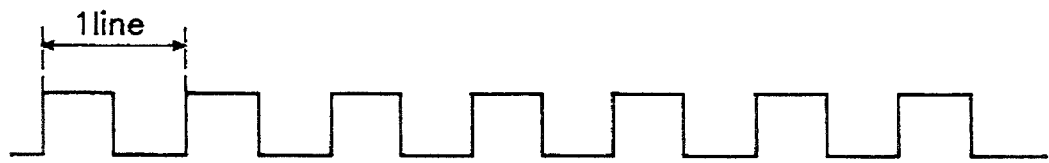
FIGS. 8A to 8F are waveform diagrams of signals from components of the vertical decimator in FIG. 7.
Figure 8B:

The vertical decimator 32 receives the video signal from the switch 31 in response to line input clocks as shown in FIG. 8A and outputs the received video signal in the unit of line in response to line output clocks as shown in FIG. 8B.

In detail, the video signal from the switch 31 is applied to the FIFO memory 312 through the line delay elements 3161–316($n$–1), the multipliers 3171–317$n$ and the adder 318 of the filtering circuit 315. In this case, the FIFO memory controller 313 outputs a write control signal as shown in FIG. 8D to control the write operation of the FIFO memory 312. In response to the write control signal from the FIFO memory controller 313, the FIFO memory 312 performs the write operation with respect to the video signal from the adder 318 during a first line clock interval at a period of three of the line input clocks as shown in FIG. 8A. Namely, the FIFO memory 312 stores only the first one of the successive three lines of the video signal from the adder 318 of the filtering circuit 315 in response to the write control signal from the FIFO memory controller 313.

Figure 8C:
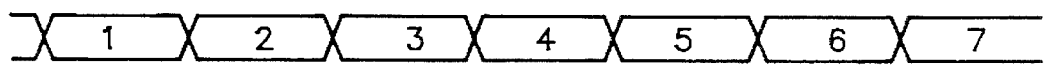
Figure 8D:
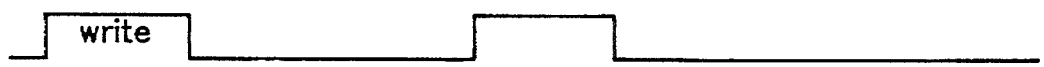

Also, synchronously with the line input clocks as shown in FIG. 8A, the video signal from the switch 31 is delayed by the line delay elements 3161–316($n$–1) of the filtering circuit 135 and then applied to the FIFO memory 311 in the unit of line, as shown in FIG. 8C. Namely, the video signal from the switch 31 is delayed by the line delay elements 3161–316($n$–1) and then written into the FIFO memory 311 in the unit of line under the control of the FIFO memory controller 313.

Figure 8E:
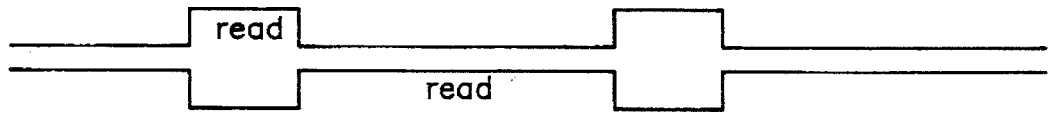
Figure 8F:
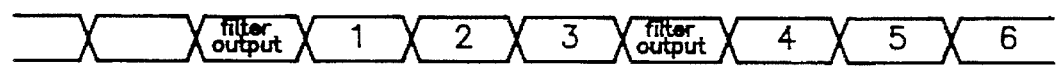

Then, the FIFO memory controller 313 outputs read control signals as shown in FIGS. 8E and 8F in response to the line output clocks as shown in FIG. 8B to control the read operations of the FIFO memories 312 and 311, respectively. In response to the read control signal from the FIFO memory controller 313, the FIFO memory 312 performs the read operation for a first line clock interval at a period of four of the line output clocks as shown in FIG. 8B at the moment that it completes the write operation. Then, in response to the read control signal from the FIFO memory controller 313, the FIFO memory 311 performs the read operation for the remaining three-line clock interval at the period of the four line output clocks.

In other words, the video signal from the switch 31 is passed through the filtering circuit 315 and the first one of the successive three lines of the passed video signal is stored into the FIFO memory 312. Also, the video signal from the switch 31 is line-delayed by the filtering circuit 315 and the delayed three lines of the video signal are sequentially stored into the FIFO memory 311 in the unit of line. Then, under the control of the FIFO memory controller 313, the FIFO memory 312 outputs the stored one line and the FIFO memory 311 then outputs the stored three lines in response to the line output clocks as shown in FIG. 8B.

The output lines from the FIFO memories 311 and 312 are alternately selected by the multiplexer 314, which thus outputs a video signal as shown in FIG. 8G.

Figure 9:
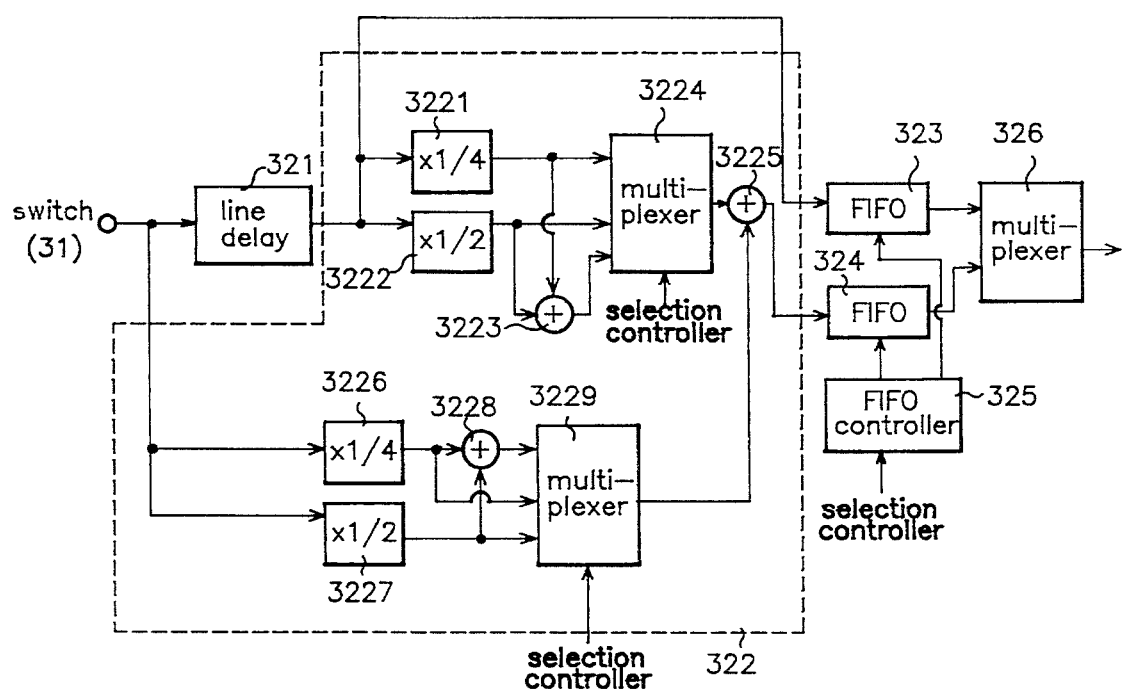
FIG. 9 is a detailed block diagram of an alternative embodiment of the vertical decimator in FIG. 1.

Referring to FIG. 9, there is shown a detailed block diagram of an alternative embodiment of the vertical decimator 32. As shown in this drawing, the vertical decimator 32 includes a line delay element 321, a line weighted average calculation circuit 322, FIFO memories 323 and 324, an FIFO memory controller 325 and a multiplexer 326. With this construction, the vertical decimator 32 performs line interpolation using weighted averages in consideration of relative positions of output lines with respect to adjacent input lines.

The line delay element 321 is adapted to delay the video signal from the switch 31 in the unit of line. The FIFO memory 323 acts to perform write and read operations with respect to a first one of successive three lines of an output video signal from the line delay element 321 under the control of the FIFO memory controller 325.

The line weighted average calculation circuit 322 is adapted to calculate weighted averages of the lines of the video signals from the switch 31 and line delay element 321 according to weighting values under the control of the selection controller 5. To this end, the line weighted average calculation circuit 322 includes a ¼ multiplier 3221 for multiplying the video signal from the line delay element 321 by ¼, a ½ multiplier 3222 for multiplying the video signal from the line delay element 321 by ½, an adder 3223 for adding output signals from the ¼ multiplier 3221 and ½ multiplier 3222, a multiplexer 3224 for selecting one of an output signal from the adder 3223 and the output signals from the ¼ multiplier 3221 and ½ multiplier 3222 under the control of the selection controller 5, a ½ multiplier 3226 for multiplying the video signal from the switch 31 by ½, a ¼ multiplier 3227 for multiplying the video signal from the switch 31 by ¼, an adder 3228 for adding output signals from the ½ multiplier 3226 and ¼ multiplier 3227, a multiplexer 3229 for selecting one of an output signal from the adder 3228 and the output signals from the ½ multiplier 3226 and ¼ multiplier 3227 under the control of the selection controller 5, and an adder 3225 for adding output signals from the multiplexers 3224 and 3229.

The FIFO memory 324 is adapted to perform write and read operations with respect to an output video signal from the adder 3225 of the line weighted average calculation circuit 322 in the unit of line under the control of the FIFO memory controller 325. The FIFO memory controller 325 controls the write and read operations of the FIFO memories 323 and 324 under the control of the selection controller 5. The multiplexer 326 selects alternately output lines from the FIFO memories 323 and 324.

As stated previously, the vertical decimator 32 functions to convert the video signal of the 787.5 vertical scanning lines into that of the 1050 vertical scanning lines. Therefore, the scanning line number conversion must be performed at a ratio of 3:4. In process of the scanning line number conversion, the first output line from the vertical decimator 32 is the same as the first input line thereto and the second output line therefrom is present between the first and second input lines thereto. Also, the third output line from the vertical decimator 32 is present between the second and third input lines thereto and the fourth output line therefrom is present between the third and first input lines thereto.

Noticeably, the second output line is nearer to the second input line rather than the first input line. As a result, for the second output line, it is preferred to obtain the weighted average by applying a larger weighting value to the second input line. Also, for the third output line, it is preferred to obtain the average of the second and third input lines because the third output line lies halfway between the second and third input lines. Further, for the fourth output line, it is preferred to obtain the weighted average by applying a larger weighting value to the third input line, since the fourth output line is nearer to the third input line rather than the first input line. The use of these weighted averages has the effect of minimizing the number of errors in the line interpolation.

Therefore, the first input line from the switch 31 is delayed by the line delay element 321, stored into the FIFO memory 323 and then outputted as the first output line through the multiplexer 326.

Also, the first input line from the switch 31 is delayed by the line delay element 321, multiplied by ¼ by the ¼ multiplier 3221 and then outputted to the multiplexer 3224. The second input line from the switch 31 is multiplied by ½ and ¼ by the ½ multiplier 3226 and the ¼ multiplier 3227, respectively, and the multiplied values are added by the adder 3228 and then outputted to the multiplexer 3229. The outputs from the multiplexers 3224 and 3229 are added by the adder 3225, stored into the FIFO memory 324 and then outputted as the second output line through the multiplexer 326.

Also, the second input line from the switch 31 is delayed by the line delay element 321, multiplied by ½ by the ½ multiplier 3222 and then outputted to the multiplexer 3224. The third input line from the switch 31 is multiplied by ½ by the ½ multiplier 3226 and then outputted to the multiplexer 3229. The outputs from the multiplexers 3224 and 3229 are added by the adder 3225, stored into the FIFO memory 324 and then outputted as the third output line through the multiplexer 326.

Further, the third input line from the switch 31 is delayed by the line delay element 321, multiplied by ¼ by the ¼ multiplier 3221 and then outputted to the multiplexer 3224. The fourth or the next first input line from the switch 31 is multiplied by ½ and ¼ by the ½ multiplier 3226 and the ¼ multiplier 3227, respectively, and the multiplied values are added by the adder 3228 and then outputted to the multiplexer 3229. The outputs from the multiplexers 3224 and 3229 are added by the adder 3225, stored into the FIFO memory 324 and then outputted as the fourth output line through the multiplexer 326.

The operation of the alternative embodiment of the vertical decimator 32 with the above-mentioned construction in accordance with the present invention will hereinafter be described in detail with reference to FIGS. 10A to 10J which are waveform diagrams of the signals from the components of the vertical decimator 32 in FIG. 9.

Figure 10A:
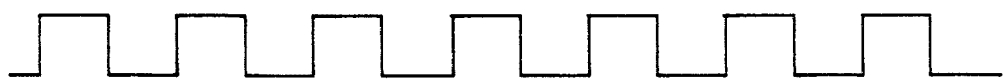
FIGS. 10A to 10I are waveform diagrams of signals from components of the vertical decimator in FIG. 9.

In the case where the number of the vertical scanning lines per frame of the output video signal from the switch 31 is 787.5, it must be converted into 1050 at a ratio of 3:4. To this end, the vertical decimator 32 receives the video signal from the switch 31 in response to line input clocks as shown in FIG. 10A and outputs the received video signal in the unit of line in response to line output clocks as shown in FIG. 10F. Here, the ratio of the line input clocks to the line output clocks is 3:4.

Figure 10B:
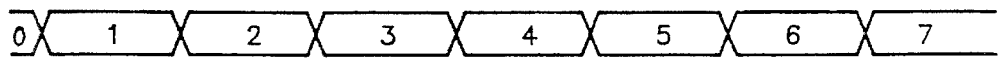

The video signal from the switch 31 as shown in FIG. 10B is delayed by the line delay element 321 and then multiplied by weighting values 0.25, 0.5 and 0.75 by the ¼ multiplier 3221, the ½ multiplier 3222 and the adder 3223, respectively. The weighted values from the ¼ multiplier 3221, the ½ multiplier 3222 and the adder 3223 are sequentially outputted through the multiplexer 3224 as shown in FIG. 10D.

Also, the video signal from the switch 31 as shown in FIG. 10B is multiplied by weighting values 0.75, 0.5 and 0.25 by the adder 3228, the ½ multiplier 3226 and the ¼ multiplier 3227, respectively. The weighted values from the adder 3228, the ½ multiplier 3226 and the ¼ multiplier 3227 are sequentially outputted through the multiplexer 3229 as shown in FIG. 10C.

Figure 10C:
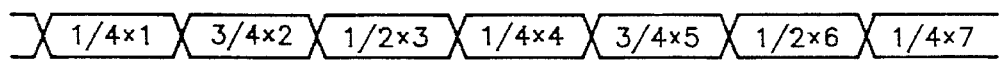
Figure 10D:
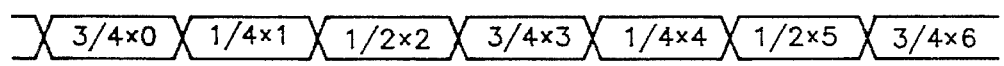
Figure 10E:
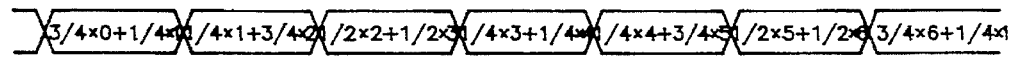
Figure 10F:

The outputs from the multiplexers 3224 and 3229 as shown in FIGS. 10D and 10C are sequentially added by the adder 3225 as shown in FIG. 10E. Because the adder 3225 performs the addition operation in such a manner that the sum of the weighting values becomes "1", the outputs from the ¼ multiplier 3221, the ½ multiplier 3222 and the adder 3223 are sequentially selected by the multiplexer 3224 and the outputs from the adder 3228, the ½ multiplier 3226 and the ¼ multiplier 3227 are sequentially selected by the multiplexer 3229.

In other words, the output from the ¼ multiplier 3221 and the output from the adder 3228 are added by the adder 3225. Also, the outputs from the ½ multipliers 3222 and 3226 are added by the adder 3225. Further, the output from the adder 3223 and the output from the ¼ multiplier 3227 are added by the adder 3225.

Figure 10G:

The FIFO memory controller 325 outputs a write control signal as shown in FIG. 10G to control the write operation of the FIFO memory 323. In response to the write control signal from the FIFO memory controller 325, the FIFO memory 323 performs the write operation during a first line clock interval at a period of three of the line input clocks as shown in FIG. 10A. Namely, the FIFO memory 323 stores only the first one of the successive three lines of the video signal from the line delay element 321 in response to the write control signal from the FIFO memory controller 325. Also, the video signal from the adder 3225 of the line weighted average calculation circuit 322 as shown in FIG. 10E is written into the FIFO memory 324 in the unit of line in response to the line input clocks under the control of the FIFO memory controller 325.

Figure 10H:
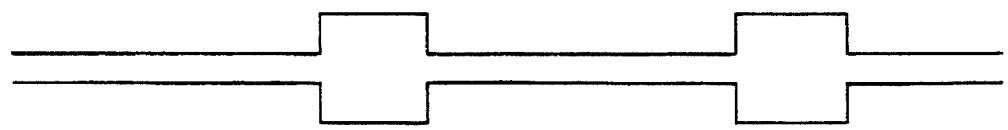
Figure 10I:
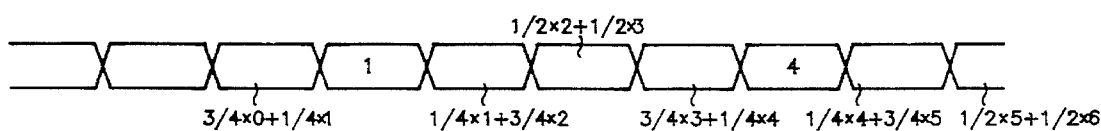

Then, the FIFO memory controller 325 outputs read control signals as shown in FIGS. 10H and 10I in response to the line output clocks as shown in FIG. 10F to control the read operations of the FIFO memories 323 and 324, respectively. In response to the read control signal from the FIFO memory controller 325, the FIFO memory 323 performs the read operation for a first line clock interval at a period of four of the line output clocks as shown in FIG. 10F at the moment that it completes the write operation. Then, in response to the read control signal from the FIFO memory controller 325, the FIFO memory 324 performs the read operation for the remaining three-line clock interval at the period of the four line output clocks.

The output lines from the FIFO memories 323 and 324 are alternately selected by the multiplexer 326, which thus outputs a video signal as shown in FIG. 10J.

Figure 11:
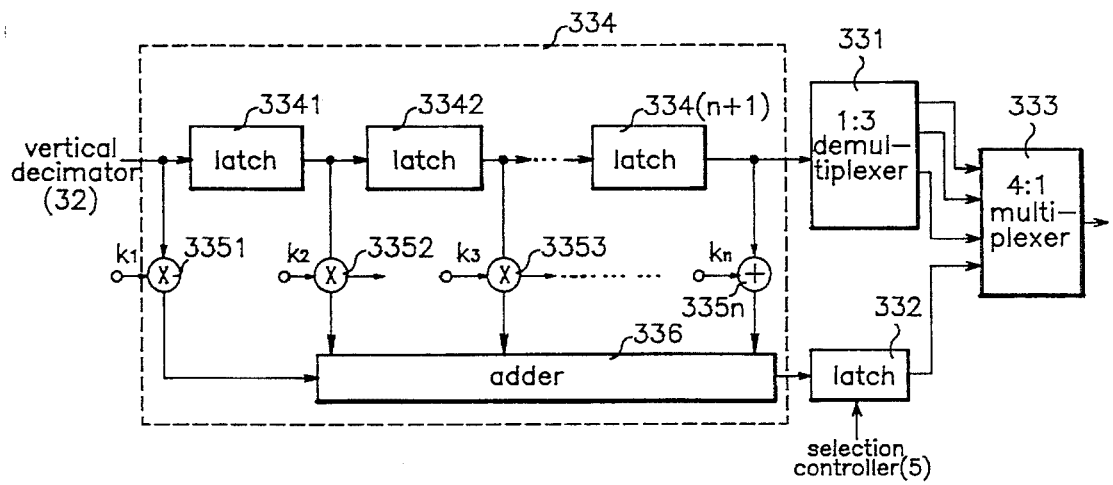
FIG. 11 is a detailed block diagram of an embodiment of a horizontal decimator in FIG. 1.

Referring to FIG. 11, there is shown a detailed block diagram of an embodiment of the horizontal decimator 33. As shown in this drawing, the horizontal decimator 33 includes a filtering circuit 334, a 1:3-demultiplexer 331, a latch 332 and a 4:1 multiplexer 333. With this construction, the horizontal decimator 33 converts the number of the horizontal scanning lines of the video signal with the 787.5 vertical scanning lines per frame into that of the video signal with the 1050 vertical scanning lines per frame under the control of the selection controller 5. Alternatively, one of successive three pixels of the input video signal may be repeated instead of employing the filtering circuit 334, for the purpose of making the construction simple.

The filtering circuit 334 includes a plurality of series-connected latches 3341–334(n–1) matched with the number of filter taps, a plurality of multipliers 3351–335n, each of which multiplies a corresponding one of the video signal from the vertical decimator 32 and output signals from the latches 3341–334(n–1) by a corresponding one of filtering coefficients K1–Kn and an adder 336 for adding output signals from the multipliers 3351–335n and outputting the resultant video signal to the latch 332. With this construction, the filtering circuit 334 removes a high frequency component from the video signal from the vertical decimator 32.

The 1:3-demultiplexer 331 is adapted to divide the video signal from the last latch 334(n–1) of the filtering circuit 334 into pixels of three phases. The latch 332 acts to latch a first one of the successive three pixels of the video signal from the adder 336 of the filtering circuit 334 under the control of the selection controller 5. The 4:1-multiplexer 333 selects alternately output pixels from the 1:3-demultiplexer 331 and the latch 332.

The operation of the embodiment of the horizontal decimator 33 with the above-mentioned construction in accordance with the present invention will hereinafter be described in detail.

The pixel number conversion must be performed at a ratio of 3:4 to convert the number of the horizontal scanning lines of the video signal from the vertical decimator 32 into that of the 1050-line video format.

The video signal from the vertical decimator 32 is filtered through the filtering circuit 334 and the first one of the successive three pixels of the filtered video signal is latched into the latch 332 under the control of the selection controller 5. Also, the video signal from the vertical decimator 32 is delayed in the unit of pixel by the latches 3341–334($n$–1) of the filtering circuit 334 and divided into the pixels of the three phases by the 1:3-demultiplexer 331.

The pixels of the three phases from the 1:3-demultiplexer 331 and the pixel of one phase from the latch 332 are multiplexed by the 4:1-multiplexer 333, which thus outputs the resultant pixels of four phases. Namely, the horizontal decimator 33 converts the number of the pixels per line at a ratio of 3:4 using the 1:3-demultiplexer 331, the latch 332 and the 4:1 multiplexer 333.

Figure 12:
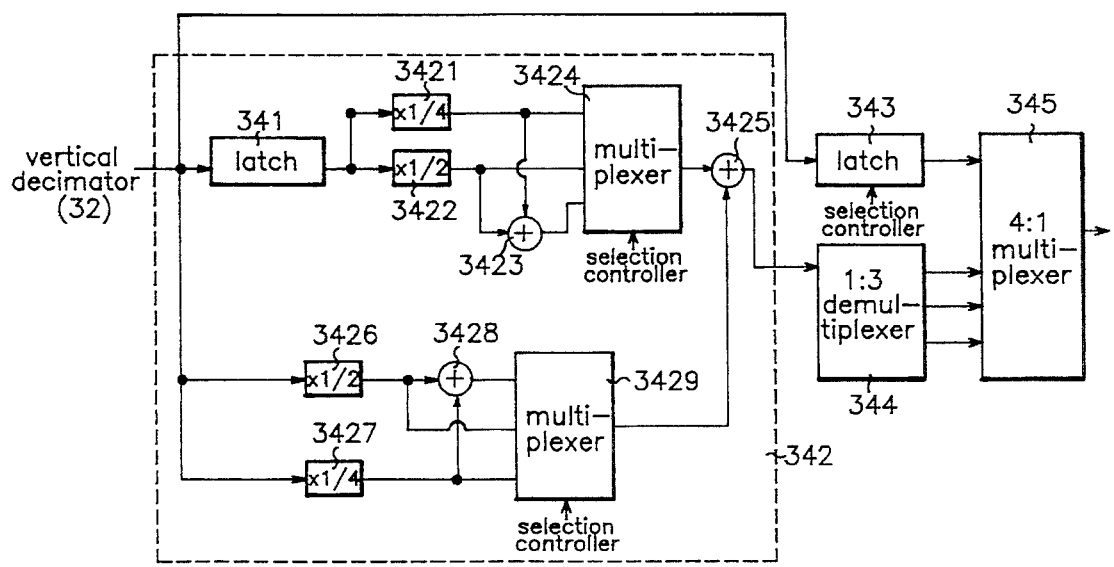
FIG. 12 is a detailed block diagram of an alternative embodiment of the horizontal decimator in FIG. 1.

Referring to FIG. 12, there is shown a detailed block diagram of an alternative embodiment of the horizontal decimator 33. As shown in this figure, the horizontal decimator 33 includes a latch 343, a pixel weighted average calculation circuit 342, a 1:3-demultiplexer 344 and a 4:1 multiplexer 345. With this construction, the horizontal decimator 33 performs pixel interpolation using weighted averages in consideration of relative positions of output pixels with respect to adjacent input pixels.

The latch 343 acts to latch a first one of successive three pixels of the video signal from the vertical decimator 32 under the control of the selection controller 5.

The pixel weighted average calculation circuit 342 is adapted to calculate weighted averages of the pixels of the video signal from the vertical decimator 32 according to weighting values under the control of the selection controller 5. To this end, the pixel weighted average calculation circuit 342 includes a latch 341 for latching the video signal from the vertical decimator 32, a ¼ multiplier 3421 for multiplying an output video signal from the latch 341 by ¼, a ½ multiplier 3422 for multiplying the video signal from the latch 341 by ½, an adder 3423 for adding output signals from the ¼ multiplier 3421 and ½ multiplier 3422, a multiplexer 3424 for selecting one of an output signal from the adder 3423 and the output signals from the ¼ multiplier 3421 and ½ multiplier 3422 under the control of the selection controller 5, a ½ multiplier 3426 for multiplying the video signal from the vertical decimator 32 by ½, a ¼ multiplier 3427 for multiplying the video signal from the vertical decimator 32 by ¼, an adder 3428 for adding output signals from the ½ multiplier 3426 and ¼ multiplier 3427, a multiplexer 3429 for selecting one of an output signal from the adder 3428 and the output signals from the ½ multiplier 3426 and ¼ multiplier 3427 under the control of the selection controller 5, and an adder 3425 for adding output signals from the multiplexers 3424 and 3429.

The 1:3-demultiplexer 344 is adapted to divide an output video signal from the pixel weighted average calculation circuit 342 into pixels of three phases. The 4:1-multiplexer 345 selects alternately output pixels from the 1:3-demultiplexer 344 and the latch 343.

As stated previously, the horizontal decimator 33 functions to convert the number of the horizontal scanning lines of the video signal with the 787.5 vertical scanning lines into that of the 1050-line video format. Therefore, the pixel number conversion must be performed at a ratio of 3:4. In process of the pixel number conversion, the first output pixel from the horizontal decimator 33 is the same as the first input pixel thereto and the second output pixel therefrom is present between the first and second input pixels thereto. Also, the third output pixel from the horizontal decimator 33 is present between the second and third input pixels thereto and the fourth output pixel therefrom is present between the third and first input pixels thereto.

Noticeably, the second output pixel is nearer to the second input pixel rather than the first input pixel. As a result, for the second output pixel, it is preferred to obtain the weighted average by applying a larger weighting value to the second input pixel. Also, for the third output pixel, it is preferred to obtain the average of the second and third input pixels because the third output pixel lies halfway between the second and third input pixels. Further, for the fourth output pixel, it is preferred to obtain the weighted average by applying a larger weighting value to the third input pixel, since the fourth output pixel is nearer to the third input pixel rather than the first input pixel. The use of these weighted averages has the effect of minimizing the number of errors in the pixel interpolation.

Therefore, the first input pixel from the vertical decimator 32 is latched by the latch 343 and then outputted as the first output pixel through the 4:1-multiplexer 345.

Also, the first input pixel from the vertical decimator 32 is latched by the latch 341, multiplied by ¼ by the ¼ multiplier 3421 and then outputted to the multiplexer 3424. The second input pixel from the vertical decimator 32 is multiplied by ½ and ¼ by the ½ multiplier 3426 and the ¼ multiplier 3427, respectively, and the multiplied values are added by the adder 3428 and then outputted to the multiplexer 3429. The outputs from the multiplexers 3424 and 3429 are added by the adder 3425, demultiplexed by the 1:3-demultiplexer 344 and then outputted as the second output pixel through the 4:1-multiplexer 345.

Also, the second input pixel from the vertical decimator 32 is latched by the latch 341, multiplied by ½ by the ½ multiplier 3422 and then outputted to the multiplexer 3424. The third input pixel from the vertical decimator 32 is multiplied by ½ by the ½ multiplier 3426 and then outputted to the multiplexer 3429. The outputs from the multiplexers 3424 and 3429 are added by the adder 3425, demultiplexed by the 1:3-demultiplexer 344 and then outputted as the third output pixel through the 4:1-multiplexer 345.

Further, the third input pixel from the vertical decimator 32 is latched by the latch 341, multiplied by ¼ by the ¼ multiplier 3421 and then outputted to the multiplexer 3424. The fourth or the next first input pixel from the vertical decimator 32 is multiplied by ½ and ¼ by the ½ multiplier 3426 and the ¼ multiplier 3427, respectively, and the multiplied values are added by the adder 3428 and then outputted to the multiplexer 3429. The outputs from the multiplexers 3424 and 3429 are added by the adder 3425, demultiplexed by the 1:3-demultiplexer 344 and then outputted as the fourth output pixel through the 4:1-multiplexer 345.

The operation of the alternative embodiment of the horizontal decimator 33 with the above-mentioned construction in accordance with the present invention will hereinafter be described in detail with reference to FIGS. 13A to 13J which are waveform diagrams of the signals from the components of the horizontal decimator 33 in FIG. 12.

Figure 13A:
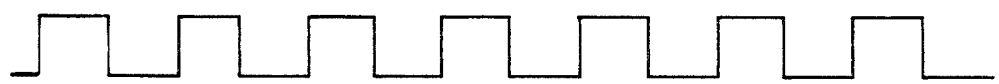
FIGS. 13A to 13J are waveform diagrams of signals from components of the horizontal decimator in FIG. 12.
Figure 13B:
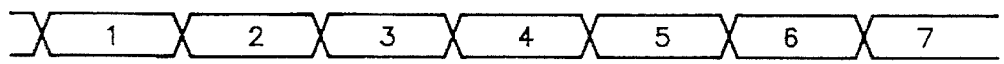
Figure 13C:
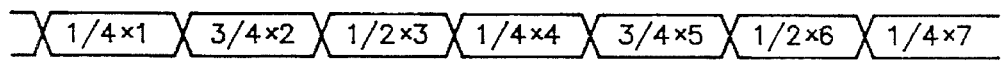
Figure 13D:
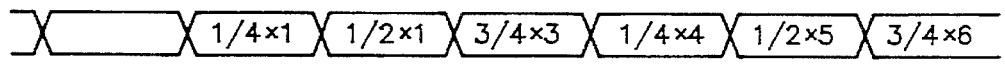
Figure 13E:
Figure 13F:
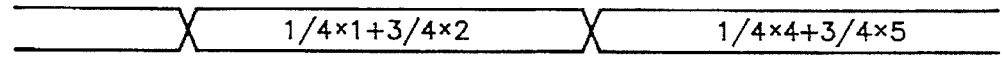
Figure 13G:
Figure 13H:
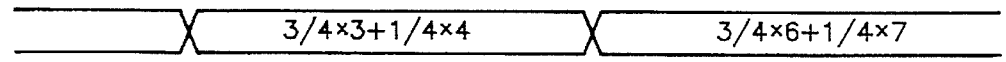
Figure 13I:

The horizontal decimator 33 receives the video signal from the vertical decimator 32 as shown in FIG. 13B in response to pixel input clocks as shown in FIG. 13A and outputs the received video signal in the unit of pixel in response to pixel output clocks as shown in FIG. 13I. Here, the ratio of the pixel input clocks to the pixel output clocks is 3:4.

The video signal from the vertical decimator 32 as shown in FIG. 13B is latched by the latch 341 and then multiplied by weighting values 0.25, 0.5 and 0.75 by the ¼ multiplier 3421, the ½ multiplier 3422 and the adder 3423, respectively. The weighted values from the ¼ multiplier 3421, the ½ multiplier 3422 and the adder 3423 are sequentially outputted through the multiplexer 3424 as shown in FIG. 13D.

Also, the video signal from the vertical decimator 32 as shown in FIG. 13B is multiplied by weighting values 0.75, 0.5 and 0.25 by the adder 3428, the ½ multiplier 3426 and the ¼ multiplier 3427, respectively. The weighted values from the adder 3428, the ½ multiplier 3426 and the ¼ multiplier 3427 are sequentially outputted through the multiplexer 3429 as shown in FIG. 13C.

The outputs from the multiplexers 3424 and 3429 as shown in FIGS. 13D and 13C are sequentially added by the adder 3425. Because the adder 3425 performs the addition operation in such a manner that the sum of the weighting values becomes "1", the outputs from the ¼ multiplier 3421, the ½ multiplier 3422 and the adder 3423 are sequentially selected by the multiplexer 3424 and the outputs from the adder 3428, the ½ multiplier 3426 and the ¼ multiplier 3427 are sequentially selected by the multiplexer 3429.

In other words, the output from the ¼ multiplier 3421 and the output from the adder 3428 are added by the adder 3425. Also, the outputs from the ½ multipliers 3422 and 3426 are added by the adder 3425. Further, the output from the adder 3423 and the output from the ¼ multiplier 3427 are added by the adder 3425.

Figure 13J:
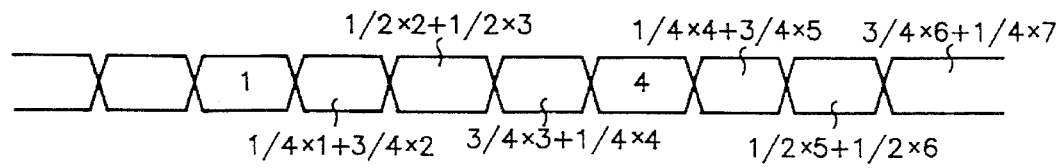

As shown in FIG. 13E, the latch 343 latches the first one of the successive three pixels of the video signal from the vertical decimator 32 in response to the pixel input clocks as shown in FIG. 13A under the control of the selection controller 5. The 1:3-demultiplexer 344 divides the output video signal from the pixel weighted average calculation circuit 342 into the pixels of the three phases as shown in FIGS. 13F to 13H. The pixels of the three phases from the 1:3-demultiplexer 344 as shown in FIGS. 13F to 13H and the pixel of one phase from the latch 343 as shown in FIG. 13E are sequentially selected by the 4:1-multiplexer 345 in response to the pixel output clocks as shown in FIG. 13I. As a result, the 4:1-multiplexer 345 outputs the resultant pixels of four phases as shown in FIG. 13J.

Figure 14:
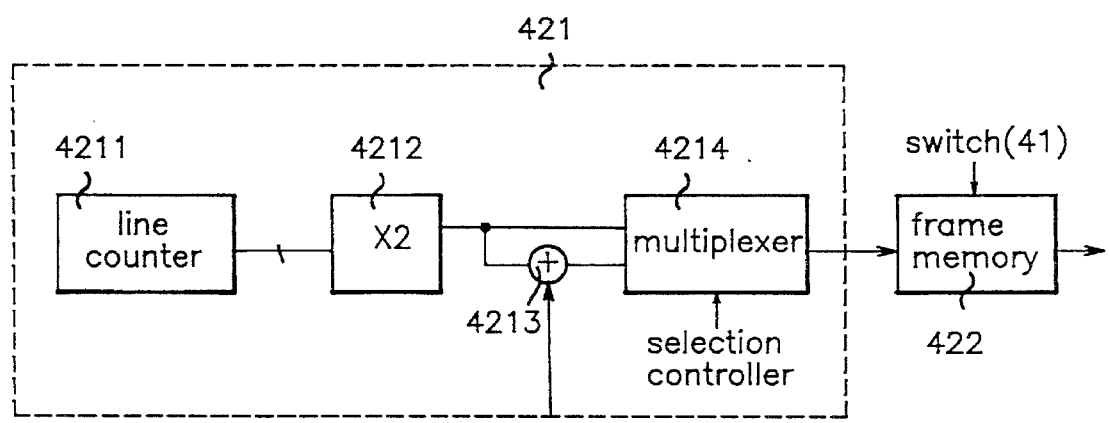
FIG. 14 is a detailed block diagram of an interlaced scanning format converter in FIG. 1.

Referring to FIG. 14, there is shown a detailed block diagram of the interlaced scanning format converter 42. As shown in this drawing, the interlaced scanning format converter 42 includes a line address generation circuit 421 and a frame memory 422.

The line address generation circuit 421 includes a line counter 4211, a multiplier 4212 for multiplying an output signal from the line counter 4211 by 2, an adder 4213 for adding 1 to an output signal from the multiplier 4212, and a multiplexer 4214 for selecting one of the output signal from the multiplier 4212 and an output signal from the adder 4213 under the control of the selection controller 5. With this construction, the line address generation circuit 421 generates line addresses under the control of the selection controller 5 to divide each frame into odd and even fields.

The frame memory 422 is adapted to store the video signal from the switch 41 in the unit of frame and output the stored video signal in the unit of field in response to the line addresses from the line address generation circuit 421.

In operation, the output signal from the line counter 4211 is multiplied by 2 by the multiplier 4212 and then applied as an even address to the multiplexer 4214. The even address from the multiplier 4212 is also added to 1 by the adder 4213 and then applied as an odd address to the multiplexer 4214.

The outputs from the multiplier 4212 and adder 4213 are selected by the multiplexer 4214 according to the corresponding fields under the control of the selection controller 5, and then applied as the line addresses to the frame memory 422.

Noticeably, the multiplication by 2 can be implemented by shifting one bit. Also, the addition to 1 can be implemented by fixing a least significant bit to 1.

The video signal of the progressive scanning type from the switch 41 is stored in the unit of frame into the frame memory 422 and then outputted therefrom, being divided into odd and even lines or the odd and even fields in response to the line addresses from the line address generation circuit 421. Namely, the even lines or the even field is read from the frame memory 422 in response to the output from the multiplier 4212 selected by the multiplexer 4214 and the odd lines or the odd field is read from the frame memory 422 in response to the output from the adder 4213 selected by the multiplexer 4214. As a result, the video signal of the progressive scanning type is converted into that of the interlaced scanning type with the odd and even fields.

As apparent from the above description, according to the present invention, any video format of the HDTV signal can be converted into the display format of the interlaced scanning type with the 1050 vertical scanning lines, with no use of a separate video format conversion apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video format conversion apparatus for a high definition television, comprising:

means for decoding an encoded signal to generate a video signal and a format signal;

first means for converting a frame rate of the video signal into 30 Hz to generate a second signal;

second means for converting a vertical resolution and a horizontal resolution of a selected one of the video signal and the second signal to generate a third signal;

third means for converting a scanning format of a selected one of the video signal, the second signal, and the third signal into an interlaced scanning format to generate a fourth signal and outputting a selected one of the fourth signal and the video signal; and means for controlling said first converting means, second converting means, and third converting means in response to the format signal.

2. A video format conversion apparatus for a high definition television, comprising:

decoding means for decoding an encoded signal to generate a first signal and a format signal;

first means for converting a frame rate of the first signal to generate a second signal;

second means for converting a vertical resolution and a horizontal resolution of a selected one of the first signal and the second signal to generate a third signal; and third means for converting a scanning format of a selected one of the first signal, the second signal, and the third signal into an interlaced scanning format to generate a fourth signal and outputting a selected one of the fourth signal and the first signal.

3. A video format conversion apparatus for a high definition television as set forth in claim 2, wherein the decoding means includes:

a circuit for variable length-decoding and demultiplexing the encoded signal to generate quantized coefficients, a motion vector and a control parameter;

means for inverse-quantizing the quantized coefficients, in response to the control parameter, and generating inverse-quantized coefficients;

means for performing an inverse discrete cosine transform with respect to the inverse-quantized coefficients to obtain a displaced frame difference signal based on video motion estimation;

means for compensating for a motion of a video signal using the motion vector to generate a compensated signal; and means for adding the displaced frame difference signal and the compensated signal.

4. A video format conversion apparatus for a high definition television as set forth in claim 2, wherein the second converting means includes:

means for selecting one of the first and second signals to generate a fifth signal in response to the format signal;

vertical decimation means for converting the number of the vertical scanning lines per frame of the fifth signal to generate a sixth signal in response to the format signal; and horizontal decimation means for converting the number of pixels per line of the sixth signal in response to the format signal.

5. A video format conversion apparatus for a high definition television as set forth in claim 2, wherein the third converting means includes:

means for selecting one of the first, second, and third signals to generate a fifth signal in response to the format signal; and means for converting the fifth signal into the interlaced scanning format in response to the format signal.

6. A video format conversion apparatus for a high definition television as set forth in claim 2, wherein the frame rate conversion means includes:

means for converting a frame rate of the first signal into 30 Hz in response to the format signal if the frame rate is 60 Hz; and means for converting the frame rate of the first signal into 30 Hz in response to the format signal if the frame rate is 24 Hz.

7. A video format conversion apparatus for a high definition television as set forth in claim 4, wherein the vertical decimation means includes:

a first FIFO memory for performing write/read operations with respect to a first one of successive three lines of the fifth signal;

a second FIFO memory for performing write/read operations with respect to the fifth signal; and a multiplexer for selecting alternately from the first and second FIFO memories.

8. A video format conversion apparatus for a high definition television as set forth in claim 4, wherein the vertical decimation means includes:

a line delay element for delaying the fifth signal by units of lines to generate a sixth signal;

a first FIFO memory for performing write and read operations with respect to a first one of successive three lines of the sixth signal;

means for calculating weighted averages of the lines of the fifth and sixth signals to generate a seventh signal;

a second FIFO memory for performing write and read operations with respect to the seventh signal; and a first multiplexer for selecting alternately from the first and second FIFO memories.

9. A video format conversion apparatus for a high definition television as set forth in claim 4, wherein the horizontal decimation means includes:

a 1:3-demultiplexer for dividing the sixth signal into pixels of three phases;

a first latch for latching a first one of successive three pixels of the sixth signal in response to the format signal; and a 4:1-multiplexer for selecting alternately output pixels from the 1:3-demultiplexer and the first latch.

10. A video format conversion apparatus for a high definition television as set forth in claim 4, wherein the horizontal decimation means includes:

a first latch for latching a first one of successive three pixels of the sixth signal in response to the format signal;

means for calculating weighted averages of the pixels of the sixth signal in response to the format signal;

a 1:3-demultiplexer for dividing an output video signal from the calculating means into pixels of three phases; and a 4:1-multiplexer for selecting alternately output pixels from the 1:3-demultiplexer and the first latch.

11. A video format conversion apparatus for high definition television as set forth in claim 2, wherein the third converting means includes:

means for generating line addresses to divide each frame of the selected one of the first signal, the second signal, and the third signal into odd and even fields; and memory for storing a signal in units of frame and outputting the stored signal in units of field in response to the line addresses from the line address generation means.

12. A video format conversion apparatus for a high definition television as set forth in claim 6, wherein the 60 Hz frame rate conversion means includes:

an FIFO memory for performing a write operation with respect to the first signal, skipping one of two frames at a period of two frame clocks, and a read operation with respect to the stored video signal at a period of twice that of the write operation to output a video signal of the 30 Hz frame rate.

13. A video format conversion apparatus for a high definition television as set forth in claim 6, wherein the 24 Hz frame rate conversion means includes:

an FIFO memory for performing write and read operations with respect to a first one of four frames of the first signal at a period of five frame clocks;

a frame memory for performing write and read operations with respect to all the four frames of the first signal in the unit of frame at the period of the five frame clocks; and a multiplexer for selecting alternately output frames from the FIFO memory and the frame memory.

14. A video format conversion apparatus for a high definition television as set forth in claim 7, wherein the vertical decimation means further includes:

filtering means for removing a high frequency component from the fifth signal.

15. A video format conversion apparatus for a high definition television as set forth in claim 8, wherein the calculating means includes:

a first ¼ multiplier for multiplying the sixth signal by ¼;

a first ½ multiplier for multiplying the sixth signal by ½;

a first adder for adding output signals from the first ¼ multiplier and the first ½ multiplier;

a second multiplexer for selecting one of an output signal from the first adder and the output signals from the first ¼ multiplier and the first ½ multiplier;

a second ½ multiplier for multiplying the fifth signal by ½;

a second ¼ multiplier for multiplying the fifth signal by ¼;

a second adder for adding output signals from the second ½ multiplier and the second ¼ multiplier;

a third multiplexer for selecting one of an output signal from the second adder and the output signals from the second ½ multiplier and the second ¼ multiplier; and a third adder for adding output signals from the second and third multiplexers.

16. A video format conversion apparatus for a high definition television as set forth in claim 9, wherein the horizontal decimation means further includes:

filtering means for removing a high frequency component from the sixth signal.

17. A video format conversion apparatus for a high definition television as set forth in claim 10, wherein the calculating means includes:

a second latch for latching the sixth signal;

a first ¼ multiplier for multiplying an output video signal from the second latch by ¼;

a first ½ multiplier for multiplying the video signal from the second latch by ½;

a first adder for adding output signals from the first ¼ multiplier and the first ½ multiplier;

a first multiplexer for selecting one of an output signal from the first adder and the output signals from the first ¼ multiplier and the first ½ multiplier;

a second ½ multiplier for multiplying the sixth signal by ½;

a second ¼ multiplier for multiplying the sixth signal by ¼;

a second adder for adding output signals from the second ½ multiplier and the second ¼ multiplier;

a second multiplexer for selecting one of an output signal from the second adder and the output signals from the second ½ multiplier and the second ¼ multiplier; and a third adder for adding output signals from the first and second multiplexers.

18. A video format conversion apparatus for a high definition television as set forth in claim 11, wherein the means for generating line addresses includes:

a line counter;

a multiplier for multiplying an output signal from the line counter by 2;

an adder for adding 1 to an output signal from the multiplier; and a multiplexer for selecting one of the output signal from the multiplier and an output signal from the adder.

19. A video format conversion apparatus for a high definition television as set forth in claim 14, wherein the filtering means includes:

a plurality of line delay elements connected in series, the line delay elements delaying sequentially the fifth signal in the unit of line and outputting the resultant video signal to the second FIFO memory;

a plurality of multipliers, each of the multipliers multiplying a corresponding one of the fifth signal and output signals from the line delay elements by a corresponding one of filtering coefficients; and an adder for adding output signals from the multipliers and outputting a resultant signal to the first FIFO memory.

20. A video format conversion apparatus for a high definition television as set forth in claim 16, wherein the filtering means includes:

a plurality of latches connected in series, the latches delaying sequentially the sixth signal in the unit of pixel and outputting the resultant video signal to the 1:3-demultiplexer;

a plurality of multipliers, each of the multipliers multiplying a corresponding one of the sixth signal and output signals from the latches by a corresponding one of filtering coefficients; and an adder for adding output signals from the multipliers and outputting the resultant video signal to said first latch.

\* \* \* \* \*